July 9, 1935.  A. L. FOX  2,007,189
PREPARATION OF AMINE HYDROHALIDES
Filed May 6, 1932  3 Sheets-Sheet 1

Arthur L. Fox, INVENTOR.
BY
ATTORNEY.

July 9, 1935. A. L. FOX 2,007,189
PREPARATION OF AMINE HYDROHALIDES
Filed May 6, 1932    3 Sheets-Sheet 2

Arthur L. Fox, INVENTOR.
BY
ATTORNEY.

July 9, 1935.  A. L. FOX  2,007,189
PREPARATION OF AMINE HYDROHALIDES
Filed May 6, 1932  3 Sheets-Sheet 3

Arthur L. Fox, INVENTOR.
BY
ATTORNEY.

Patented July 9, 1935

2,007,189

UNITED STATES PATENT OFFICE 2,007,189

PREPARATION OF AMINE HYDROHALIDES

Arthur Lawrence Fox, Wilmington, Del., assignor to E. I. du Pont de Nemours & Company, Wilmington, Del., a corporation of Delaware Application May 6, 1932, Serial No. 609,741

13 Claims. (Cl. 260—130.5)

This invention relates to the preparation of organic compounds and more particularly to the preparation of amine hydrohalides.

In the past amine hydrochlorides have been prepared by the reactions carried out with hydrochloric acid in aqueous solutions. In order to isolate the amine hydrochloride produced by such a process it has been necessary to either concentrate (for example, by evaporation) the solution or salt out (for example, with an excess of hydrochloric acid) the desired product. This process has not been commercially desirable in general because of the great solubility and hygroscopic character of amine hydrochlorides. Ordinarily practical results were not obtainable.

An improvement over the above mentioned process is described by Ahlum in U. S. Patent 1,303,624 of May 13, 1919, according to which a dry amine (for example, aniline) and dry hydrogen chloride gas are reacted in the presence of a non-aqueous solvent (for example, benzene). Even with this process difficulties are encountered in the filtration of certain amine hydrochlorides from the solvent.

It has now been found that quantitative yields of substantially pure amine hydrohalides in very desirable physical form may be prepared in the absence of a solvent by bringing an atomized or vaporized anhydrous amine into contact with anhydrous hydrohalide vapors under such conditions that the reaction of the two takes place in a zone whose temperature is higher than the boiling point of the amine.

This invention has for an object the preparation of amine hydrohalides in a very desirable physical form, and by a commercially feasible process. Other objects are the preparation of amine hydrohalides under anhydrous conditions, their preparation in the absence of a solvent, their preparation by means of hydrogen halide gases, their preparation by means of the interaction of a hydrogen halide gas and an atomized amine, their preparation by the interaction of a hydrogen halide gas and a vaporized amine, their preparation by the interaction of a hydrogen halide gas and an amine at a temperature above the boiling point of the amine, their preparation by the interaction of a hydrogen halide gas and an amine at a temperature above the boiling point of the resultant amine hydrohalide and in general an advancement of the art. Other objects will appear hereinafter.

The above mentioned objects are accomplished by atomizing or vaporizing an amine and contacting it with a gaseous hydrogen halide in a zone whose temperature is greater than the boiling point of the amine and preferably in a zone whose temperature is greater than the boiling point of the resultant amine hydrohalide. The invention will be further understood from a consideration of the accompanying drawings and the following description which includes several specific examples. In the examples the parts are given by weight.

The process of the invention is advantageously carried out using apparatus such as that illustrated in the accompanying drawings in which similar numerals refer to similar parts throughout the several views and description thereof.

Figure 1:
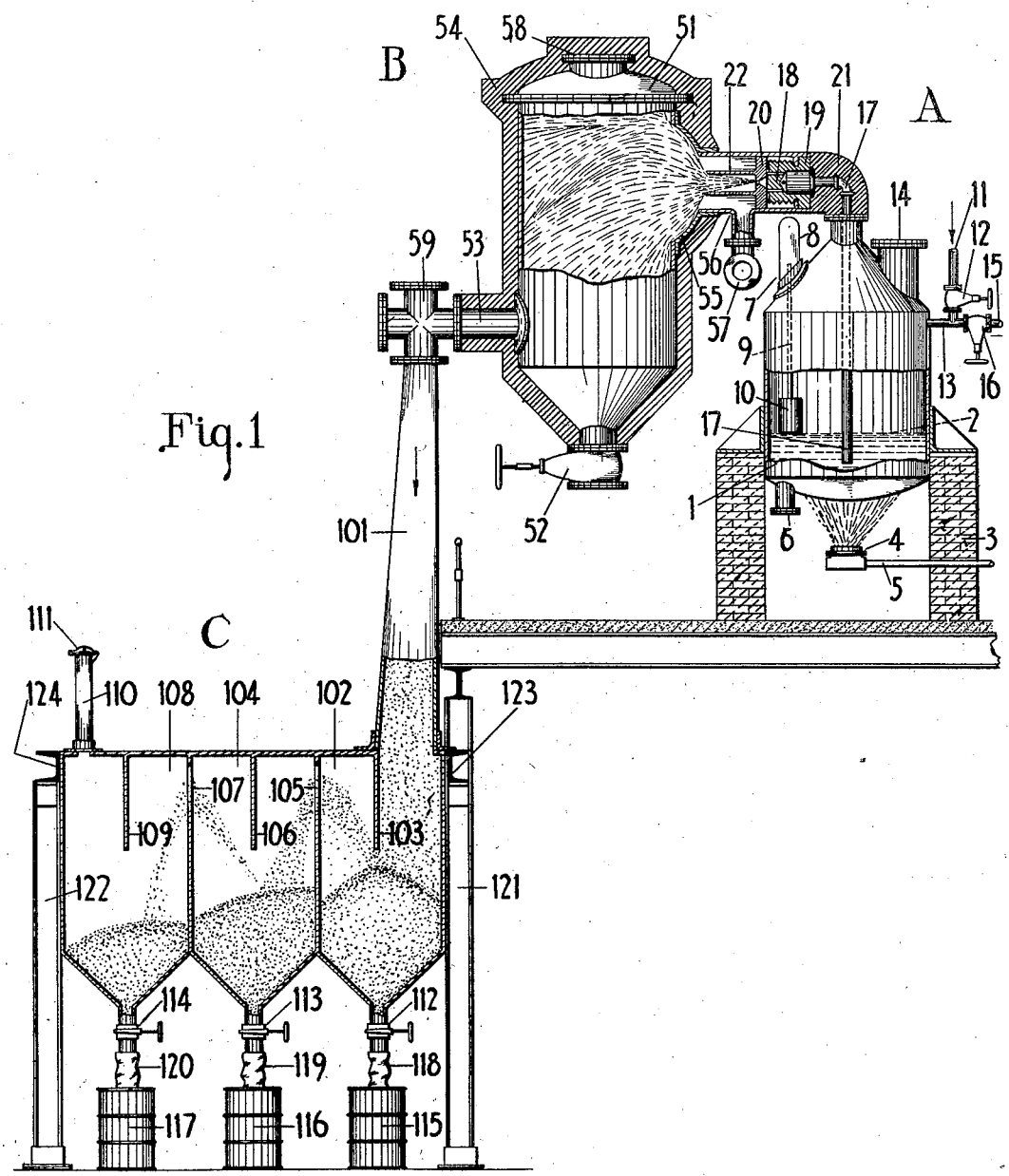
Fig. 1 is a side view partly in section and somewhat diagrammatic of one form of apparatus for carrying out the invention.

In general, this invention involves atomizing or vaporizing an amine and contacting it in that physical state with a hydrogen halide gas and collecting the amine hydrohalide formed. One form of apparatus for atomizing or vaporizing the amine is indicated in the drawings generally by the letter A. The atomized amine may be conveniently contacted with the hydrogen halide gas in such an apparatus as generally indicated in Fig. 1 by the letter B. The resultant amine hydrohalide may be collected in any suitable form of apparatus. One specific form is indicated generally in Fig. 1 by the letter C.

Referring to Fig. 1 of the drawings, 1 indicates a reservoir or kettle containing a supply of an amine indicated at 2. This reservoir is supported upon upright columns such as that indicated by the numeral 3 and there is provided a gas burner 4 which may be used for heating the kettle. A supply of gas for the burner 4 is furnished by pipe line 5. The container has a bottom outlet 6 and a device generally indicated at 7 for indicating the level of the liquid therein.

The indicating device 7 consists of a transparent housing 8 (glass or the like), mounted on the top of the kettle and an indicating rod 9 movably mounted in the housing 8 and supported by a float 10 resting on top of the liquid in the kettle. The reservoir may be filled with a liquid amine by means of an inlet pipe 11, through valve 12 and pipe 13. A large opening 14 is arranged in the top of the reservoir for the introduction of solid amines. A supply of air or other inert gas under pressure (not shown) is connected through pipe 15, valve 16 and line 13 to the kettle. By proper regulation of the valve 16 the contents of the kettle are placed under sufficient pressure to force the amine through line 17 into a spraying device generally indicated at 18.

This atomizing device involves a distributing part 19 and an outer plate section 20. In order to keep the amine at constant temperature that part of the pipe 17 which extends from the reservoir 1 to the distributing part 19 of the nozzle is covered with heat insulating material (asbestos or the like) which is indicated at 21. The spray plate 20 has a hollow cylindrical extension 22 thereon for conducting the atomized or vaporized amine into the reaction vessel 51.

This reaction vessel has a bottom outlet through valve 52 and a side outlet through pipe line 53. Its outer surface is lagged with some heat insulating material as indicated at 54 for maintaining the proper temperature therein. This vessel has a bell-shaped opening 55 through which the atomized or vaporized amine and hydrogen chloride enter. The amine material enters through the cylindrical spray plate extension 22 as pointed out above and the hydrogen halide enters through the annular space between part 22 and cylindrical pipe 56 which surrounds the aforesaid spray plate extension. Entry to the pipe 56 is had through the line 57 which line is connected with a suitable source of dry hydrogen halide.

An opening in the top of the reaction vessel is closed by a closure plate indicated at 58. The lagging on the reaction chamber also extends over the exit pipe 53.

The amine hydrohalide formed leaves through pipe 53 and passes through the cross 59, into the receiving apparatus generally indicated at C. This receiving apparatus involves an inlet pipe 101 connected with the cross 59 and with a receiving chamber 102. The material passes down into this chamber around baffle plate 103 and into a second receiving chamber 104 through an opening generally indicated at 105.

During its passage through chamber 102 and around baffle plate 103 most of the amine hydrohalide settles out.

Most of the remaining amine hydrohalide settles out during its passage around a baffle plate 106 in chamber 104. Any remaining amine hydrohalide passes through opening 107 into a third receiving chamber 108 containing a baffle plate 109 where it settles out. Outlet 110 having a closure 111 permits the escape of gases when the apparatus is operated under such conditions that pressures in excess of atmospheric exist in the receiver 108. Each of the receiving chambers has a bottom outlet through a closure device as indicated by the valves 112, 113 and 114. From these closures suitable containers, for example, the drums 115, 116 and 117 may be filled by means of flexible nozzles 118, 119 and 120. The containers 102, 104 and 108 are supported by means of vertical beams 121 and 122 and horizontal beams 123 and 124.

Figure 2:
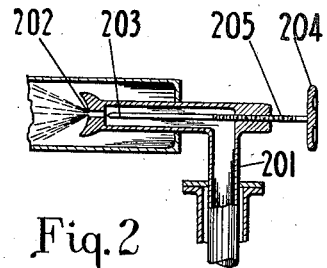
Figs. 2, 3 and 4 are somewhat similar views of modified forms of the atomizing device.

In Fig. 2 another form of atomizing device is disclosed. This device includes a pipe 201 through which the amine enters. The amine escapes through a small opening 202, the size of which is regulated by a needle 203 which is regulated by means of a handwheel 204 and a screw 205.

Figure 3:
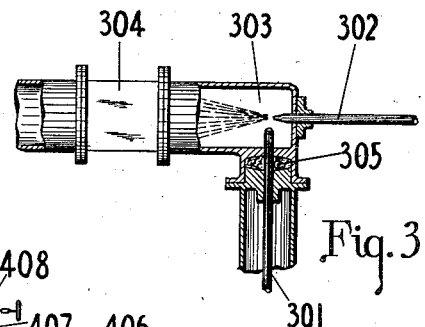

Another form of atomizing device is disclosed in Fig. 3. In this figure the amine enters the device through line 301 and is blown into a spray by a jet of air or other inert gas entering through the line 302. The spray leaving the atomizing chamber generally indicated at 303 passes through an extension thereof made of glass or other transparent material and indicated at 304 into the reaction chamber which is not shown in this figure. By having the atomized amine pass through a section of transparent material the character of the jet of atomized material may be observed. Suitable regulation of the jet may be made from the information thus obtained. In the device shown the inlet pipe 301 passes through a body of packing material 305.

Figure 4:
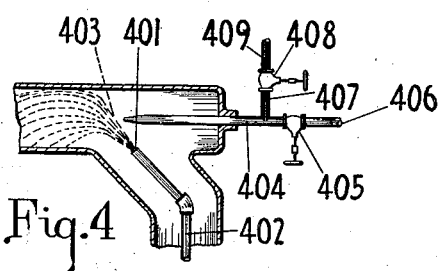

Still another form of atomizing device is disclosed in Fig. 4. In this figure a stream of amine indicated at 401 enters through line 402. At the point generally indicated at 403 it is disintegrated by a blast of air or other inert gas entering through line 404. The gas entering is regulated by means of a valve 405 between the line 404 and the line 406 which line (406) is connected with a suitable source of gas under pressure. In certain instances it may be desirable to add a hydrogen halide as or with the atomizing gas. For this reason the line 407 and valve 408 are provided. A suitable source of a hydrohalide gas is connected through line 409 to the valve 408.

Figure 5:
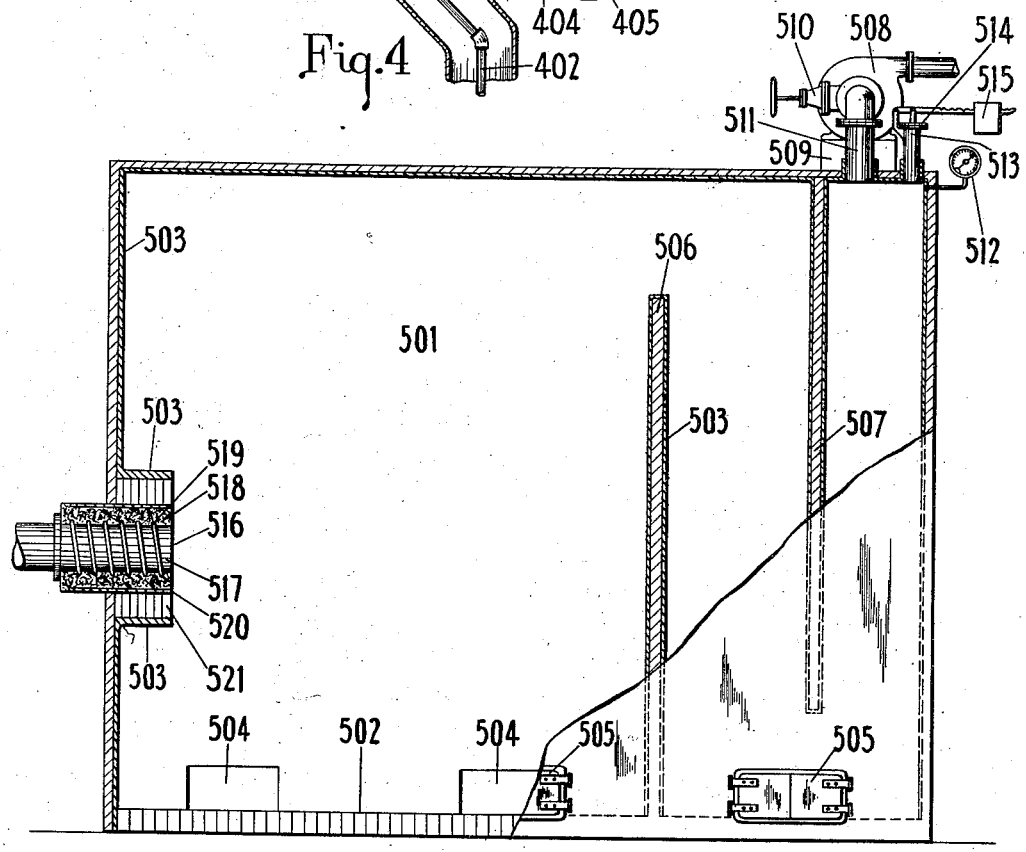
Fig. 5 is a side view partly in section and somewhat diagrammatic of a modified form of amine hydrohalide collection chamber.

In Fig. 5 there is shown an alternative form of collection chamber generally indicated at 501. The collection chamber except for the bottom 502 which is covered with brick is lined with some corrosion-resistant material (lead or the like) generally indicated at 503. This chamber has doors such as indicated at 504 and 505 through which the amine hydrohalide may be removed as desired. For the purpose of facilitating the settling of the amine hydrohalide, baffles 506 and 507 are provided on the interior of the chamber 501. Under certain conditions of operation it may be desirable to maintain the collection chamber under subatmospheric or superatmospheric pressure. For the purpose of maintaining reduced pressure therein a suction device 508 mounted on a base 509 is provided. This suction device is connected through valve 510 and line 511 to the chamber 501. Superatmospheric pressure may be produced in the collection chamber by closing or throttling the valve 510.

A gauge 512 is connected to the chamber in the vicinity of the line 511, for the purpose of indicating the pressure within the chamber. As further shown in Fig. 5, a vent 513 having a closure 514 is provided. An adjustable lever and weight arrangement indicated at 515 limits the degree of superatmospheric pressure in the collection chamber by permitting the escape of gases through the said vent. As will be clear the weight may be moved along the lever to any desired position. Obviously the nearer the weight is to to the closure 514 the less chamber pressure required to open the said closure. The collection chamber has an inlet generally indicated at 516. This inlet comprises a central heat and corrosion-resistant material (for example, tantalum, special corrosion-resistant steel or some vitreous substance) generally indicated at 517 around which is located some heat resistant material 518 (for example asbestos, kieselguhr or the like). A heating coil 519 surrounds the part 517 and is embedded in the part 518, which material in turn is located within a metallic shell shown at 520. On the interior of the chamber 501 between the shell 520 and the lining 503 there is another body of heat-resistant material (for example, brick or the like) indicated at 521.

Figure 6:
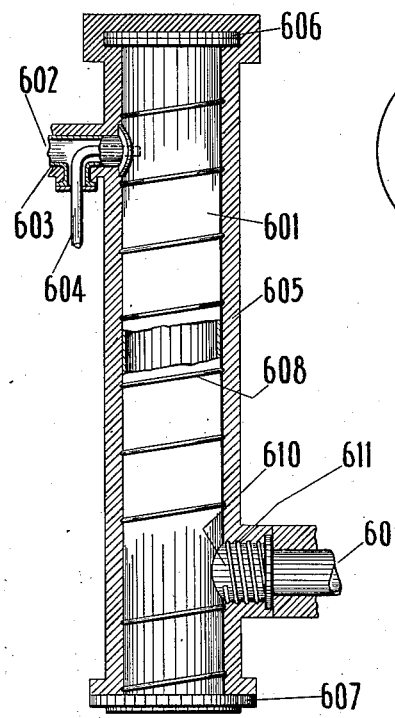
Fig. 6 is a side view partly in section and somewhat diagrammatic of a modified form of reaction chamber.

In Fig. 6 which illustrates a modified form of reaction chamber there is disclosed a vertical corrosion-resistant metal shell generally indicated at 601 which has near its top an inlet generally indicated at 602. This inlet comprises a large pipe indicated at 603 for the admission of the amine and which is concentric about a smaller pipe 604 through which the hydrohalide gas enters.

As shown in the figure the end of the hydrohalide gas line 604 extends into the reaction chamber but if desired this may be flush with the side of the cylindrical jacket 601 or the same may terminate within the amine entry line 603. The reaction chamber is surrounded by a heat resistant material 605 and has a top closure generally indicated at 606. The bottom of the reaction chamber is indicated at 607. For the purpose of maintaining proper temperatures within the reaction chamber an electric coil 608 is provided for heating the walls thereof. This heating element 608 is embedded in the heat insulation material 605. Near the bottom of the reaction chamber there is an outlet generally indicated at 609. This outlet comprises a corrosion-resistant cylindrical section 610 surrounded by a heating element 611 for the purpose of maintaing the same at the proper temperature. The heating element is embedded in the heat insulation material 605 which surrounds the exit 609 as well as the main portion of the reaction chamber.

Figure 7:
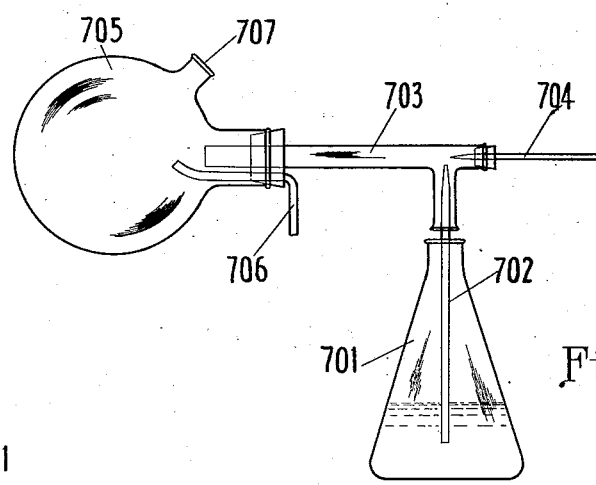
Fig. 7 is an elevation of an apparatus for carrying out the invention on a small scale.

In Fig. 7 there is illustrated a device for carrying out the invention on a small scale. This comprises an amine reservoir 701 having an outlet through line 702. This line extends into an atomization or vaporization chamber 703. A gas line 704 extends into the atomization or vaporization chamber. This line supplies the air or other gas which causes the atomization and vaporization of the amine. A combined collection and reaction chamber is illustrated at 705. The atomization and vaporization chamber extends into this chamber.

A line 706 is provided for the admission of the hydrohalide gas. The line 706 terminates adjacent the end of the atomization or vaporization chamber 703. In operation the reaction takes place in this zone and the amine hydrohalide formed settles to the bottom of the container 705. An outlet 707 for the escape of the gas entering through line 704 is provided. If desired the outlet 707 may be connected to a vacuum producing apparatus for the facilitation of the removal of the air or other gas previously referred to.

Figures 8, 9:
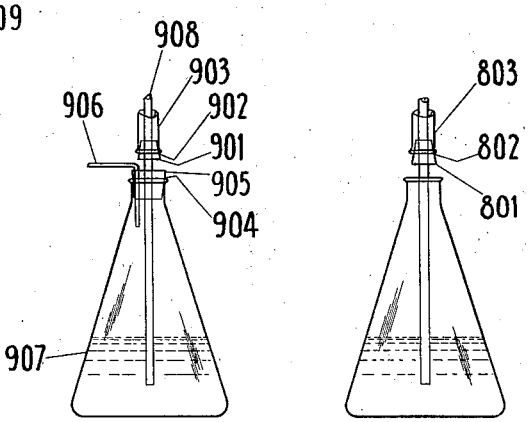
Figs. 8, 9, 10 and 11 are elevations of parts of modified forms of the apparatus shown in Fig. 7.

In Fig. 8 there is illustrated a modification in the atomization or vaporization chamber. In this figure the atomization chamber 803 is sealed as indicated at 802 by a closure means 801. The modification illustrated in this figure is advantageous where it is desired to maintain specific pressure conditions within the chamber 803.

Under certain instances it is desirable to force the amine into the atomization or vaporization chamber under pressure and means for accomplishing this is illustrated in Fig. 9. As shown in this figure the atomization and vaporization chamber 903 is closed at 902 by a closure means 901. The amine reservoir is closed at 904 by a closure means 905 through which a line 906 extends. Air or any desired gas may be forced through the line 906 resulting in the forcing of the liquid amine generally indicated at 907 out through the line 908 into the atomizattion and vaporization chamber 903.

Figure 10:
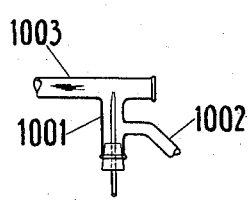

A modified form of atomization or vaporization chamber is illustrated in Fig. 10. In this figure the main chamber 1003 has an outlet at 1002 through which any unvaporized or atomized amine which might collect in the portion 1001 of the atomization and vaporization chamber 1003 may escape.

Figure 11:
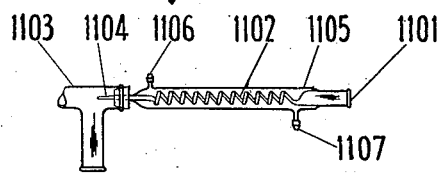

As described in the apparatus previously mentioned, the amine may be preheated by the application of heat to the amine reservoir. It has been found advantageous in certain instances to preheat the gas used for atomizing and vaporizing the amine and a form of apparatus for accomplishing this result is illustrated in Fig. 11. In that figure the gas for atomization or vaporization of the amine enters through opening 1101 and passes through coil 1102. After leaving this coil the gas enters the atomization or vaporization chamber 1103 in the same manner as illustrated in Fig. 7 through line 1104. Surrounding the coil portion 1102 is a vessel 1105 having an inlet 1106 and an outlet at 1107. Hot liquids or gases (for example, the gases escaping from the reaction and collection chamber illustrated in Fig. 7) may enter through inlet 1106, give up their heat to the gas in the coil 1102 and pass out through the outlet 1107.

In the small scale apparatus last described the atomizing-gas jet passing over the line from the amine reservoir causes the amine to be withdrawn from the line in ordinary instances. However, as stated above, pressure may be employed to force the amine into the blast of gas. The gas employed for this purpose may be any gas which is not reacted upon either by the amine or the hydrogen halide. As examples there may be mentioned air, carbon dioxide, nitrogen, helium, argon and the like.

As previously stated in connection with large scale apparatus the amine is passed into the reaction chamber as a vapor or in an atomized condition at such a temperature that the reaction between it and the hydrohalide gas takes place in a zone above the vaporization point of the amine. The reactions herein described are exothermic and some of the heat necessary to bring the reaction zone to its proper temperature may be supplied by the reaction itself. When the process is being operated entirely in the vapor phase the level of the amine in the reservoir is kept below the bottom of the line leading to the reaction chamber. In this way any liquid is prevented from passing out through this line into the reaction chamber. In some instances it is desirable to maintain the temperature of the amine evaporator above the vaporization point of the amine in which case the amine is vaporized as soon as it enters the chamber and passes on out into the reaction chamber. This type of evaporation vessel is usually referred to as a flash evaporator. To aid in further understanding the invention, the following examples are given.

*Example I*

During a period of one hour 90 parts of vaporized pyridine from a flash evaporator maintained at 200° C. and 75 parts of hydrogen chloride gas were passed into a reaction chamber maintained at about 220° C. The resultant pyridine hydrochloride collected as a liquid. After cooling it solidified into a crystalline mass.

Example II

One hundred (100) parts of aniline were placed in a container and atomized by means of an air jet. A force feed was not used. The atomized material was passed into a reaction chamber which had previously been filled with dry hydrogen chloride gas. Clouds of aniline hydrochloride were formed. There was very little condensation in the reaction chamber, most of the fine hydrochloride being carried through into a condensing chamber to which it was connected. This was largely due to the rapid entrance of the air which had been used for atomization. The yield was quantitative and the amine hydrochloride was produced in the form of very fine white crystals.

Example III

One hundred (100) parts of ortho-anisidine were atomized as in Example II, except that the amine was introduced into the air jet by means of pressure. It was found that very desirable results could be obtained by decreasing the size of the orifice and increasing the pressure of the atomizing jet (as compared to Example II). The yield was quantitative.

Example IV

While maintaining the reaction chamber at 240° C.–260° C., 45 parts of aniline vapor were passed thereinto during a period of 30 minutes. Over the same period 35 parts of hydrogen fluoride vapors were also added. There was recovered a white solid which was identified as aniline hydrofluoride. A portion of the product changed to a liquid upon exposure to moist air.

Example V

One hundred (100) parts of hydrogen bromide, 5 parts of nitrogen and 125 parts of di-n-butyl-amine vapor were passed into the reaction chamber which was maintained at 200° C.–240° C. About 200 parts of white di-butyl-amine hydrobromide were collected.

Example VI

With the reaction chamber at a temperature of 225° C.–240° C. there was passed into it 125 parts of di-n-butyl-amine vapor and 30 parts of hydrogen fluoride vapor over a period of one hour. White di-butyl-amine hydrofluoride formed.

Example VII

One hundred (100) parts of N-butyl-amine were atomized according to the process set out in Example III. A quantitative yield was obtained.

Example VIII

A quantitative yield of ortho-toluidine hydrochloride was obtained when 100 parts ortho-toluidine were atomized according to the process described in Example III. Very desirable results were obtained when the air for atomization had been preheated.

Example IX

Ortho-toluidine was placed in an evaporator and heated so that it was vaporized at the rate of about 100 parts (by weight) per hour into the reaction chamber. At the same time, substantially dry hydrogen chloride gas was being added to the reaction chamber at the rate of 50 parts (by weight) per hour. The operation was carried out for about nine hours. Clouds of ortho-toluidine were formed.

There was substantially no condensation in the reaction chamber, most of the fine hydrochloride settled out in the condensing chamber into which it passed. The yield was essentially quantitative and the hydrochloride was produced in the form of small white crystals.

Example X

When 100 parts of piperidine were atomized according to the process set out in Example III, a quantitative yield of the hydrochloride was obtained.

Example XI

Quantitative yields were obtained by atomizing ethyl-aniline by the process described in Example III.

Example XII

With di-butyl-amine atomized and treated as described in Example III, a quantitative yield of its hydrochloride was obtained.

Example XIII

One hundred (100) parts of aniline were atomized by means of a forced feed and a nozzle (no atomizing gas jet being used). The atomized material was passed into an atmosphere of dry hydrogen chloride and a quantitative yield of aniline hydrochloride was obtained.

This invention is not limited to any group or class of amines but is applicable to all organic bases capable of forming a stable dry hydrohalide. The amine nitrogen atom may be primary, secondary or tertiary. It may be attached to an acyclic, carbocyclic or heterocyclic nucleus and may be a ring member of a cyclic compound. As examples of amines to which the application of the process herein described merits special mention, there may be listed: benzyl-amine, n-propyl-amine, n-butyl-amine, ortho - tolu - benzyl - amine, di-n-butyl-amine, di-benzyl-amine, tri-methyl-amine, tri-ethyl-amine, beta-phenyl-ethyl-amine, alpha-phenyl-ethyl-amine, beta-naphthyl-ethyl-amine, ethyl-aniline, methyl-aniline, ortho-toluidine, meta-toluidine, methyl-amine, para-toluidine, alpha-naphthyl-ethyl-amine, aniline, ortho-anisidine, ethyl-amine, para-phenetidine, benzyl-aniline, b:b'-di-naphthylamine, alpha-naphthylamine, beta-naphthylamine, alpha-amino-anthraquinone, beta-amino-anthraquinone, 1:5-di-amino-anthraquinone, 1:4-di-amino-anthraquinone, 1:3 - di-amino - anthraquinone, piperidine, pyridine, ortho - di - amino - benzene, meta-di-amino-benzene, nicotine, quinoline, cyclo-hexyl-amine, morpholine, para-phenylene-di-amine, aliphatic - amino - acid - esters, glycine-methyl-esters, glycine - ethyl - esters, amino - di-phenyl-amine, di - amino - di - phenyl-amine, di-ethanolamine, xylidines, amino-phenols, amino-quinolines, para-phenylene-di-amine, di - anisidine, benzidine, amino-di-phenyl, amino-naphthol, pyrrole, guanidine, amino-benzoic acid and amino-naphthoic acid. Limited only by its contribution to the instability of the basic derivative or its hydrohalide any substituent for example, halogen, hydroxyl, nitro and carboxyl may be attached to the nucleus treated.

As will be clear from the above, the particular temperature at which the reaction is carried out depends upon the particular amine and/or its hydrohalide. The vaporization point of the amines and their hydrohalides covers a wide range of temperatures as will be clear from the following table of vaporization points.

|  | °C. |
| --- | --- |
| n-Propyl-amine | 49 |
| Piperidine | 106 |
| Benzyl-amine | 184 |
| Aniline | 184 |
| Ortho-toluidine | 199 |
| Methyl-amine hydrochloride | 230 |
| Ortho-toluidine hydrochloride | 242 |
| Aniline hydrochloride | 245 |
| Meta-toluidine hydrochloride | 250 |
| Para-toluidine hydrochloride | 257 |
| Para-phenylene-di-amine | 267 |
| Beta-naphthylamine | 306 |
| Di-ethyl-amine hydrochloride | 330 |
| b:b'-Di-naphthylamine | 471 |

In some instances it may be desirable to operate at temperatures slightly in excess of the actual vaporization point of the amine or its hydrohalide. Aniline is very satisfactorily treated at temperatures slightly above its boiling point, for example, 185° C. to 200° C. or at temperatures slightly above the boiling point of its hydrochloride, for example 247° C. or 250° C. to 260° C. Orthotoluidine is desirably treated within such temperature ranges as 200° C. to 210° C. and 245° C. to 270° C. Where no particular advantage is to be gained by carrying the amine hydrohalide a great distance from the reaction zone, temperatures in the vicinity of but in excess of the boiling point of the amine may be used advantageously.

So far as now appears the only limiting factors in the matter of temperature are the stabilities of the organic base and its hydrohalide. In all cases the lower temperature limit is at the vaporization point of the amine and the upper temperature limit is that where decomposition of the amine or its hydrohalide renders the process uneconomical.

The range of compounds which may be satisfactorily treated may be extended over that ordinarily practical by such expedients as subatmospheric and superatmospheric pressures, temperatures above and below ordinary temperatures, gas-tight apparatus, dehydrating conditions and the like.

As previously indicated the method of atomizing and the degree of atomization may be varied quite widely. It has been found practical to obtain the atomization by forcing a jet of air or other gas over an opening through which the liquid amine is drawn or forced. Proper adjustment of the atomizing gas jet avoids the necessity for forced flow of the amine. Such a modification of the process is not ordinarily used since it introduces a rather large volume of gas into the apparatus. Satisfactory atomization is also obtained by means of a high pressure feed through properly constructed nozzles.

Some vaporization always takes place during the atomizing process particularly in operations involving atomization with a gas. If the gas used for atomizing is preheated the accompanying vaporization is facilitated and more completely attained. If desired the amine may be vaporized completely in this manner and the vapor passed into the hydrogen halide atmosphere.

The mixing or contacting chamber is held at a temperature at or above the vaporizing temperature of the basic derivative in the preferred procedure. Collection of the product in a separate chamber is facilitated by maintaining the mixing chamber at a higher temperature than that necessary for the vaporization of the particular hydrohalide formed.

The proportions of the reacting components may be varied over a wide range to obtain any desired result but for efficient operation and high purity of the product it is usually desirable to maintain the hydrogen halide present in at least the theoretical proportions.

Throughout the specification and claims, the term "hydrogen halide" is used to denote anhydrous hydrogen halide and the term "hydrohalide acid" is used to denote the aqueous solution of the hydrogen halide.

By "atomized material" is meant a gas suspension of liquid particles and the term is used to include any vaporized material which may be formed in the atomization process described.

While the process above described has been treated as an anhydrous process, it is not intended to indicate that the presence of small amounts of water prevents the process from being commercially practical.

For large scale apparatus it is desirable to use corrosion-resistant material. For the vaporizer "Hastalloy A" (a molybdenum containing steel) or tantalum have been found suitable. Lead functions satisfactorily for the lining of the collection or condensation chamber. In small scale apparatus glass or the like may be used satisfactorily excepting when hydrogen fluoride is present.

Where the amine hydrohalide formed is a liquid it may be desirable to appropriately modify the storage chamber in which it is received from the reaction chamber.

The processes herein described have the advantage of producing amine hydrohalides by clean-cut extremely rapid and quantitative procedures. They have the further advantage that they can be applied to the preparation of organic base hydrohalides heretofore impossible of preparation because of their instability to water.

As many apparently widely different embodiments of this invention may be made without departing from the spirit and scope thereof, it is to be understood that I do not limit myself to the specific embodiments thereof except as defined in the appended claims.

I claim:

1. The process which comprises contacting an atomized amine and a hydrogen halide gas at a temperature not exceeding 471° C.

2. The process which comprises contacting a vaporized amine and a hydrogen halide gas at a temperature not exceeding 471° C.

3. The process which comprises contacting an atomized amine and a hydrogen halide gas in which the contact takes place in a zone whose temperature is in excess of the boiling point of the amine but below a temperature which will result in failure to form the corresponding amine hydrohalide said upper temperature limit in no case exceeding 471° C.

4. The process which comprises contacting an atomized amine and a hydrogen halide gas in which the contact takes place in a zone whose temperature is in excess of the boiling point of the amine hydrohalide formed but below a temperature which will result in failure to form the corresponding amino hydrohalide said upper temperature limit in no case exceeding 471° C.

5. The process which comprises contacting a vaporized amine and a hydrogen halide gas in which the contact takes place in a zone whose temperature is in excess of the boiling point of the amine hydrohalide formed but below a temperature which will result in failure to form the corresponding amine hydrohalide said upper temperature limit in no case exceeding 471° C.

6. The method of making an aromatic amine hydrohalide which comprises reacting in the vapor phase an aromatic amine and a hydrogen halide said reaction being carried out at temperatures not exceeding 471° C.

7. The method of making an ortho-toluidine hydrohalide which comprises reacting in the vapor phase ortho-toluidine and a hydrogen halide said reaction being carried out at temperatures not exceeding 270° C.

8. The method of making ortho-toluidine hydrochloride which comprises reacting in the vapor phase ortho-toluidine and hydrogen chloride said reaction being carried out at temperatures not exceeding 270° C.

9. The method of making an aromatic amine hydrohalide, which comprises reacting in the vapor phase and at a temperature below 250° C. between an aromatic amine and a hydrogen halide.

10. In the process of preparing an anhydrous amine hydrochloride, the step which comprises passing an anhydrous amine vapor into dry hydrogen chloride gas at a temperature not greater than 471° C.

11. The method of making an aromatic amine hydrohalide, which comprises reacting in the vapor phase and at a temperature below a temperature which will result in failure to form the corresponding amine hydrohalide, between an aromatic amine and a hydrogen halide said reaction being carried out at temperatures not exceeding 471° C.

12. The method of making ortho-toluidine hydrochloride which comprises reacting in the vapor phase but below a temperature which will result in failure to form ortho-toluidine hydrochloride, ortho-toluidine and hydrogen chloride said reaction being carried out within the temperature range 245° C. to 270° C.

13. The method of making an ortho-toluidine hydrohalide which comprises reacting in the vapor phase but below a temperature which will result in failure to form the corresponding ortho-toluidine hydrohalide, artho-toluidine and a hydrogen halide said reaction being carried out within the temperature range 245° C. to 270° C.

ARTHUR LAWRENCE FOX.

CERTIFICATE OF CORRECTION.

Patent No. 2,007,189.    July 9, 1935.

ARTHUR LAWRENCE FOX.

It is hereby certified that error appears in the printed specification of the above numbered patent requiring correction as follows: Page 3, second column, line 5, for "atomizattion" read atomization; page 5, second column, line 71, claim 4, for "amino" read amine; and page 6, second column, line 23, claim 13, for "artho-toluidine" read ortho-toluidine; and that the said Letters Patent should be read with these corrections therein that the same may conform to the record of the case in the Patent Office.

Signed and sealed this 8th day of October, A. D. 1935.

Leslie Frazer (Seal) Acting Commissioner of Patents.